(12) United States Patent
Toeniskoetter

(10) Patent No.: US 8,028,559 B2
(45) Date of Patent: Oct. 4, 2011

(54) FLYING ROLLER HEMMING ANVIL PROCESS

(75) Inventor: James B. Toeniskoetter, Rochester Hills, MI (US)

(73) Assignee: Hirotec America, Inc., Auburn Hills, MI (US)

( * ) Notice: Subject to any disclaimer, the term of this patent is extended or adjusted under 35 U.S.C. 154(b) by 454 days.

(21) Appl. No.: 12/221,765

(22) Filed: Aug. 6, 2008

(65) Prior Publication Data

US 2009/0038361 A1    Feb. 12, 2009

Related U.S. Application Data

(60) Provisional application No. 60/963,590, filed on Aug. 6, 2007.

(51) Int. Cl.
*B21D 7/02*     (2006.01)
*B23P 11/00*    (2006.01)

(52) U.S. Cl. ...................................... 72/214; 29/243.58

(58) Field of Classification Search ............... 72/210, 72/211, 214, 220; 29/243.57, 243.58
See application file for complete search history.

(56) References Cited

U.S. PATENT DOCUMENTS 7,134,309 B2 * 11/2006 Toeniskoetter ............ 29/243.58
7,254,973 B2 *  8/2007 Campian .......................... 72/220

FOREIGN PATENT DOCUMENTS

JP         01107925 A  *  4/1989
JP      2003225721 A  *  8/2003

OTHER PUBLICATIONS

Kim. H.H., KR 2006007835 A, Jan. 26, 2006, "Roller type hemming device comprising plural hydraulic cylinders fixed to a frame, plural hemming rollers, plural guide rollers and plural hydraulic cylinders for moving the guide rollers," English Abstract provided.*

* cited by examiner

*Primary Examiner* — Teresa Ekiert
(74) *Attorney, Agent, or Firm* — Fildes & Outland, P.C.

(57) ABSTRACT

A roller hemming system for edge hemming vehicle closures from nested metal panels includes an anvil robot moveably supporting a hemming anvil having a working surface, a clamping spider cooperable with the anvil robot for clamping the nested metal panels on the working surface, an anvil register including a base and a registration feature for matingly positioning the hemming anvil thereto, a hemming robot including a multi-axis controllable arm, a roller hemming apparatus mounted on a distal end of the multi-axis arm, the roller hemming apparatus being moveable along edges of the nested metal panels on the anvil to hem the panels together.

14 Claims, 15 Drawing Sheets

FLYING ROLLER HEMMING ANVIL PROCESS

CROSS REFERENCE TO RELATED APPLICATION

This application claims the priority of U.S. Application No. 60/963,590 filed Aug. 6, 2007.

TECHNICAL FIELD

This invention relates to robotic roller hemming, and more particularly to a roller hemming system and method including a registerable flying anvil.

BACKGROUND OF THE INVENTION

It is known in the art relating to hemming to hem an upturned edge of one or more preformed metal panels to form a hemmed joint or closed panel assembly such as automotive vehicle closure panel assemblies including doors, hoods, deck lids, lift gates, and tailgates.

Conventional roller hemming processes typically require placement of a hemming workpiece into tooling or a fixture anvil having part locating features. For example, a hemming apparatus may be mounted to a multi-axis controllable robot and may include a hem roller carried by a support. The hemming apparatus is adapted for hemming a bent edge portion of the workpiece positioned on the hemming die, by rotating the hem roller under pressure along the bent portion. The roller type hemming apparatus can thus be used for continuous hemming along the contour of the edge of the workpiece. This process, however, requires the use of a dedicated robot to transport the workpiece to the hemming die and positioning of the workpiece in the die. For example, a robot separate from the roller hemming robot may move the workpiece to and from the hemming die.

Further, in conventional hemming processes, the anvil is stationary and typically is disposed horizontally in a generally parallel relationship with the floor of a hemming production work cell. This can increase production time as workpieces and the roller hemming robot must be brought to the anvil to complete the hemming process. Also, due to the disposition of the anvil, when a set of nested metal panels is positioned on the anvil for hemming, an outer panel of the set is disposed with its class “A” surface facing downward towards the floor, thereby limiting the flexibility of the hemming process.

SUMMARY OF THE INVENTION

The present invention provides a roller hemming system and method that includes an anvil robot that mounts a lightweight hemming anvil, a workpiece to be hemmed such as a vehicle closure assembly, and a clamping spider. The anvil robot thereby eliminates the need for a separate part transfer robot in the roller hemming process. The system and method also includes an anvil register. The anvil carrying robot positions the anvil into a mating relationship with the anvil register, allowing for repeatable location of the anvil and mounted workpiece for roller hemming operations.

These and other features and advantages of the invention will be more fully understood from the following detailed description of the invention taken together with the accompanying drawings.

BRIEF DESCRIPTION OF THE DRAWINGS

In the drawings:

FIG. 1 is a schematic view of a roller hemming system in accordance with the invention;

FIG. 2 is another schematic view of a roller hemming system in accordance with the invention;

FIG. 3 is another schematic view of a roller hemming system in accordance with the invention;

FIG. 4 is another schematic view of a roller hemming system in accordance with the invention;

FIG. 5 is a schematic view of a cornering unit of the roller hemming system in accordance with the invention;

FIG. 6 is another schematic view of a cornering unit of the roller hemming system;

FIG. 7 is another schematic view of a cornering unit of the roller hemming system;

FIG. 8 is another schematic view of a cornering unit of the roller hemming system;

FIG. 9 is another schematic view of a cornering unit of the roller hemming system;

FIG. 10 is another schematic view of a cornering unit of the roller hemming system illustrating the function of a flexible lever and programmed path of a corner unit actuator;

FIG. 11 is another schematic view of the cornering unit of FIG. 5 illustrating an actuator being remotely mounted;

FIG. 12 is a schematic view of a cornering unit illustrating swing clamps;

FIG. 13 is a schematic view of the roller hemming system illustrating an anvil passing an outer panel under a mastic and sealer nozzles;

FIG. 14 is a operational schematic view of the roller hemming system illustrating an additional robot grabbing a spider with hemmed panels and dropping off hemmed panels to final assembly operations and retrieving a completed assembly and handing off to a next station and then retrieving an inner panel and then loading it to an outer panel on the anvil; and FIG. 15 is a schematic view of the roller hemming system illustrating an anvil robot and anvil in position to accept an outer panel being loaded.

DETAILED DESCRIPTION OF THE INVENTION

Figure 1:
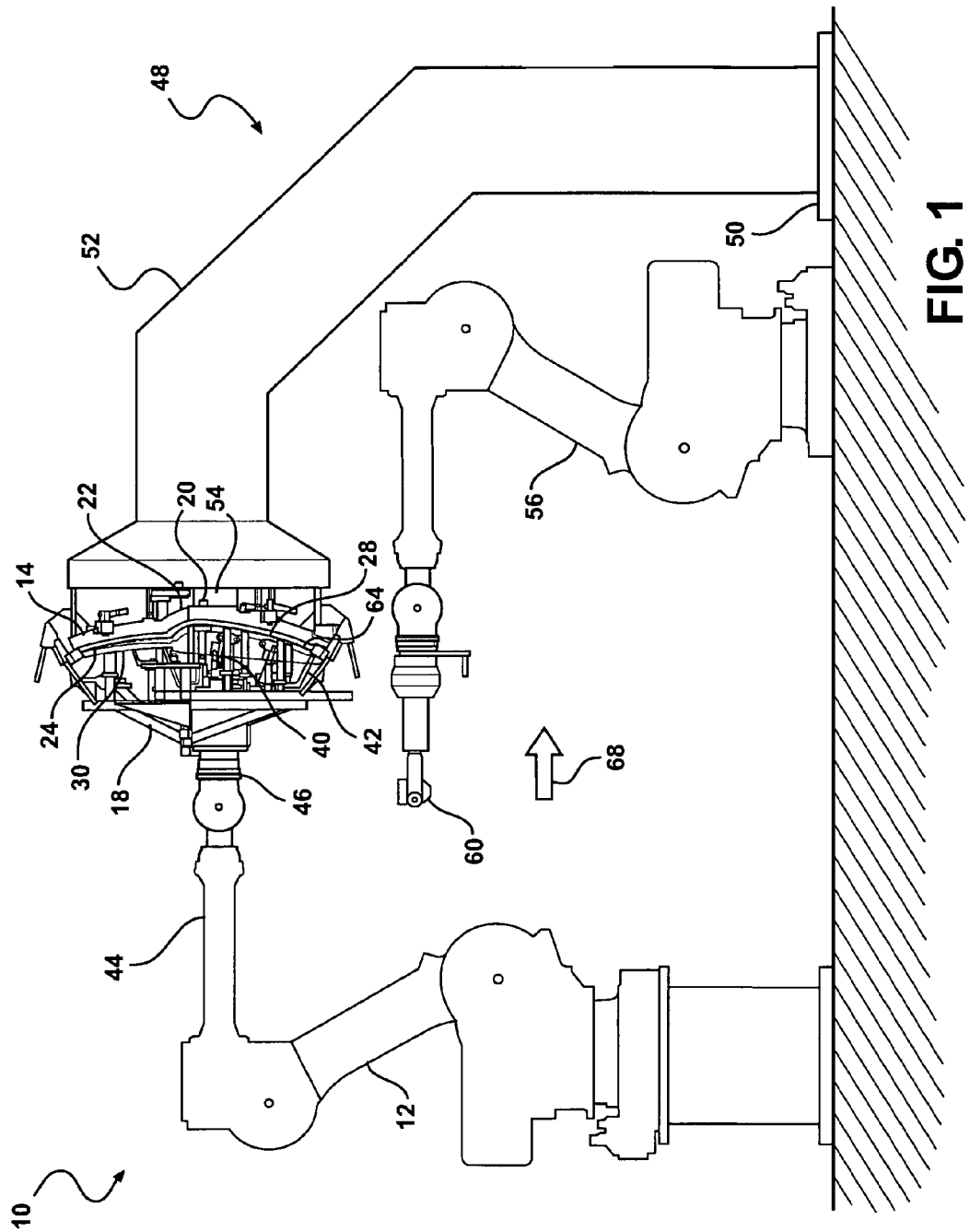

Referring to the drawing figures, a roller hemming system 10 in accordance with the invention includes an anvil such as a lightweight-hemming anvil 14. The anvil 14 includes a working surface 24 adapted for supporting a workpiece such as a metal panel or set of nested metal panels 30. For example, the workpiece may comprise preformed inner 26 and outer 28 nested metal panels 30 that can be hemmed together to form a vehicle closure assembly such as a door, hood, deck lid, lift gate, or tailgate. The outer panel 28 may be supported against the working surface 24 of the anvil 14 and the inner panel 26 may be located adjacent the outer panel 28 in a nested disposition.

The hemming system further includes a clamping spider 18. In a closed position, the clamping spider may releasably retain the nested metal panels 30 against the working surface 24 of the anvil 14. For example, the clamping spider 18 may include a plurality of pivotal swing clamps 32 (FIG. 12) that pivot between an open position 34 and a closed position 36. In the closed position 36, the swing clamps engage a clamp surface 38 of the anvil 14 opposite the working surface 24 of the anvil 14. When the clamping spider 18 is in the closed position, the nested metal panels 30 are held between the anvil 14 and the clamping spider 18. The clamping spider 18 may further include a plurality of register pins 40. The register pins 40 locate the metal panels and properly position the clamping spider 18 relative to the metal panels 30. The clamping spider 18 may also include a plurality of pressure pads 42 that push the metal panels 30 against the working surface 24 of the anvil 14 to further secure the metal panels 30.

The roller hemming system 10 further includes a first robot ("anvil robot") 12 having a multi-axis controllable arm 44 and a tool exchange end effector 46 such as a tool exchanger at a distal end of the arm. The tool exchanger 46 may releasably mount the clamping spider 18 to the robot arm 44. The clamping spider 18 may be disposed between the end of the robot arm 44 and the anvil 14, and the mounted metal panels 30 are generally faced towards the end of the robot arm. Alternatively, the anvil 14 may be releasably mounted on the tool exchanger 46. In this disposition, the anvil 14 is disposed between the end of the robot arm 44 and the clamping spider 18, and the mounted metal panels 30 are generally faced away from the end of the robot arm 44, providing increased access to the metal panels 30 as described in more detail below.

The anvil robot 12 can move the mounted anvil 14 through space to various locations in a hemming production work cell 48 that are within the reach of the arm 44. Hence, the anvil 14 may be referred to as a "flying anvil." The anvil robot 12 also can move the anvil 14 and retained metal panels 30 within the hemming work cell 48 in various orientations. The anvil 14 can be oriented with its working surface 24 facing up, down, to the side, or essentially at any angle relative to the floor of the hemming work cell 48. Likewise, the retained metal panels 30 can also be oriented in any position relative to the floor such that the class "A" surface 64 of the outer panel 28 may face downwards, upwards, sideways, or at any other angle relative to the floor. The orientation of the anvil 14 and metal panels 30 may be flexibly varied depending upon the requirements of a specific assembly process in which the present hemming system is employed.

The hemming system 10 further includes an anvil register 54 having a base 50 positioned relative to or on the floor of the hemming work cell 48 and an elongated structure 52 extending from the base 50. The anvil register 54 has a registration feature 20 at an end of the elongated structure 52 distal the floor that may be referred to as a "strong back register." The anvil 14 may be mated at 22 with the registration feature 20 to assure consistent and repeatable location of the anvil 14 and retained metal panels 30 to allow for performance of hemming operations on the metal panels 30.

The hemming system 10 also includes at least one hemming robot 56 including a multi-axis controllable arm 58 having a roller hemming apparatus 60 mounted on a distal end. When the anvil 14 and retained metal panels 30 are mated 22 with the registration feature 20 of the anvil register 54, the hemming robot 56 positions the roller hemming apparatus 60 relative to the working surface 24 of the anvil 14 and the edges of the metal panels 30. The hemming robot 56 may then move the roller hemming apparatus 60 along the edges of the metal panels 30 to hem the metal panels 30 together.

The hemming system anvil robot 12 may locate the anvil 14 with the registration feature 20 of the anvil register 54 and the hemming robot 56 may move the roller hemming apparatus 60 along an edge of the metal panels 30 to perform a single hemming pass. The anvil robot 12 may then rotate the anvil 14 and re-register the anvil 14 with the registration feature 20, thereby repositioning the metal panels 30 relative to the roller hemming apparatus 60. The hemming robot 56 may then perform another hemming pass with the roller hemming process. The steps are then repeated until hemming of the metal panels 30 is completed.

The hemming system may include a plurality of hemming robots 56. The anvil robot 12 may locate the anvil 14 with the registration feature 20 of the anvil register 54 and each hemming robot 56 may move its associated roller hemming apparatus 60 to a unique side edge of the metal panels 30 to perform a single hemming pass. The hemming robots 56 may then move the roller hemming apparatus 60 along the edges of the metal panels 30 generally simultaneously to hem together the edges of the metal panels 30 in one synchronous operation. Whether multiple robots are employed may be determined based upon hemming work cell cycle time requirements. The multiple hemming robot embodiment is capable of faster cycle times and therefore higher hemming work cell output.

As illustrated in FIG. 1, the registration feature 20 of the anvil register. 54 may be oriented such that when the anvil 14 is mated at 22 with the registration feature 20, the anvil 14 and metal panels 30 mounted on the anvil 14 are disposed in a generally vertical position. Due to this orientation, the hemming robot 56 applies a pull hemming force 68 against the metal panels 30 in a generally horizontal direction. Also, the clamping spider 18 is mounted to the tool exchanger 46 of the anvil robot 12 and is disposed between the anvil robot 12 and the anvil 14.

Figure 2:
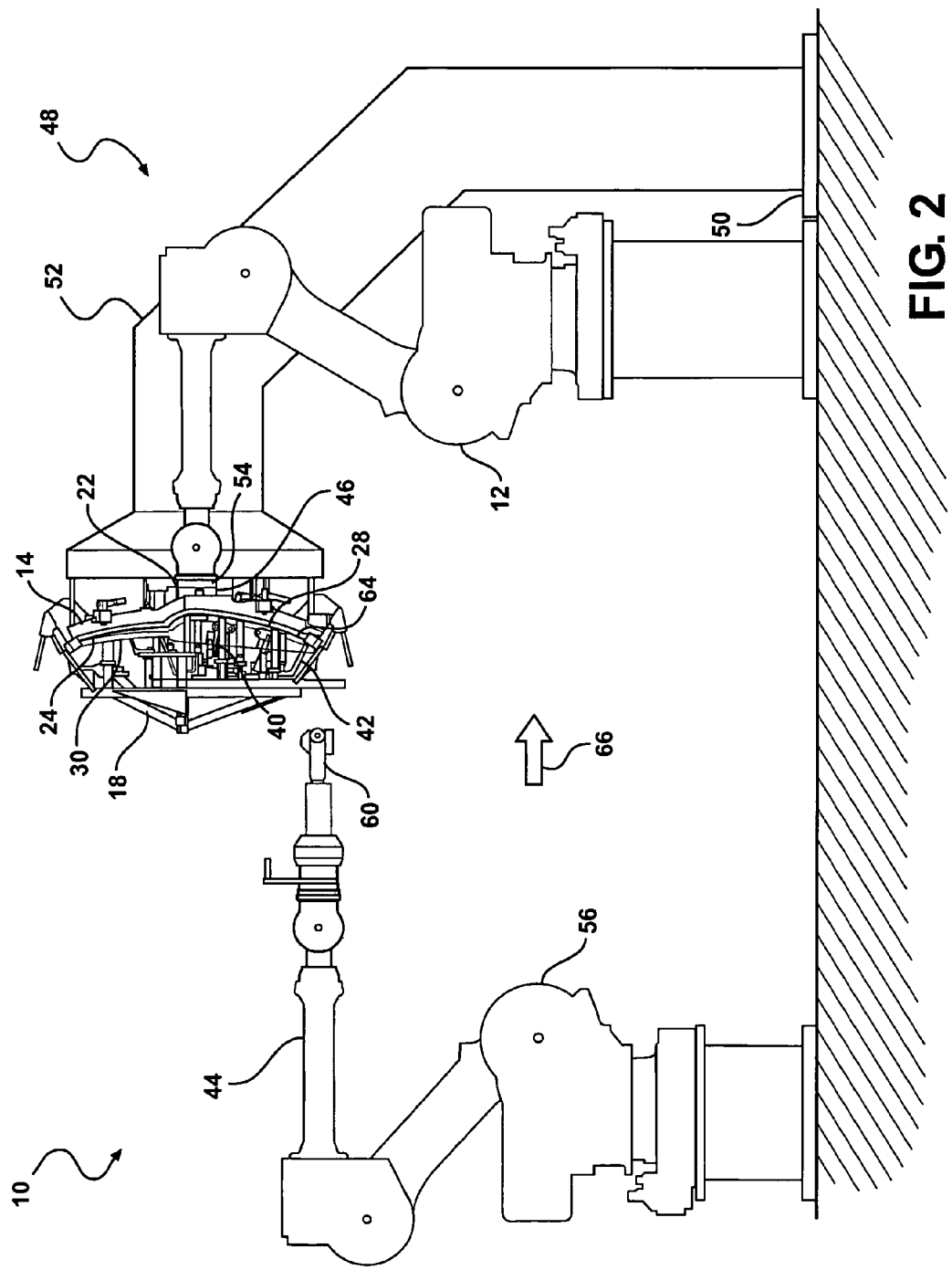

As illustrated in FIG. 2, the anvil 14 and clamping spider 18 are reversed such that the anvil 14 is mounted to the tool exchanger 46 of the anvil robot 12 and is disposed between the anvil robot 12 and the clamping spider 18. Due to this orientation, the metal panels 30 supported and retained on the anvil working surface 24 face away from the anvil robot 12. The hemming robot 56 therefore has better access to the panels for performing hemming with the roller hemming apparatus 60. This is especially advantageous for hemming operations such as vehicle door glass channel hemming. Further, the anvil 14 and metal panels 30 are disposed in a generally vertical position when the anvil 14 is mated at 22 with the registration feature of the anvil register 54, and the push hemming force 66 is applied in a generally horizontal direction.

Figure 3:
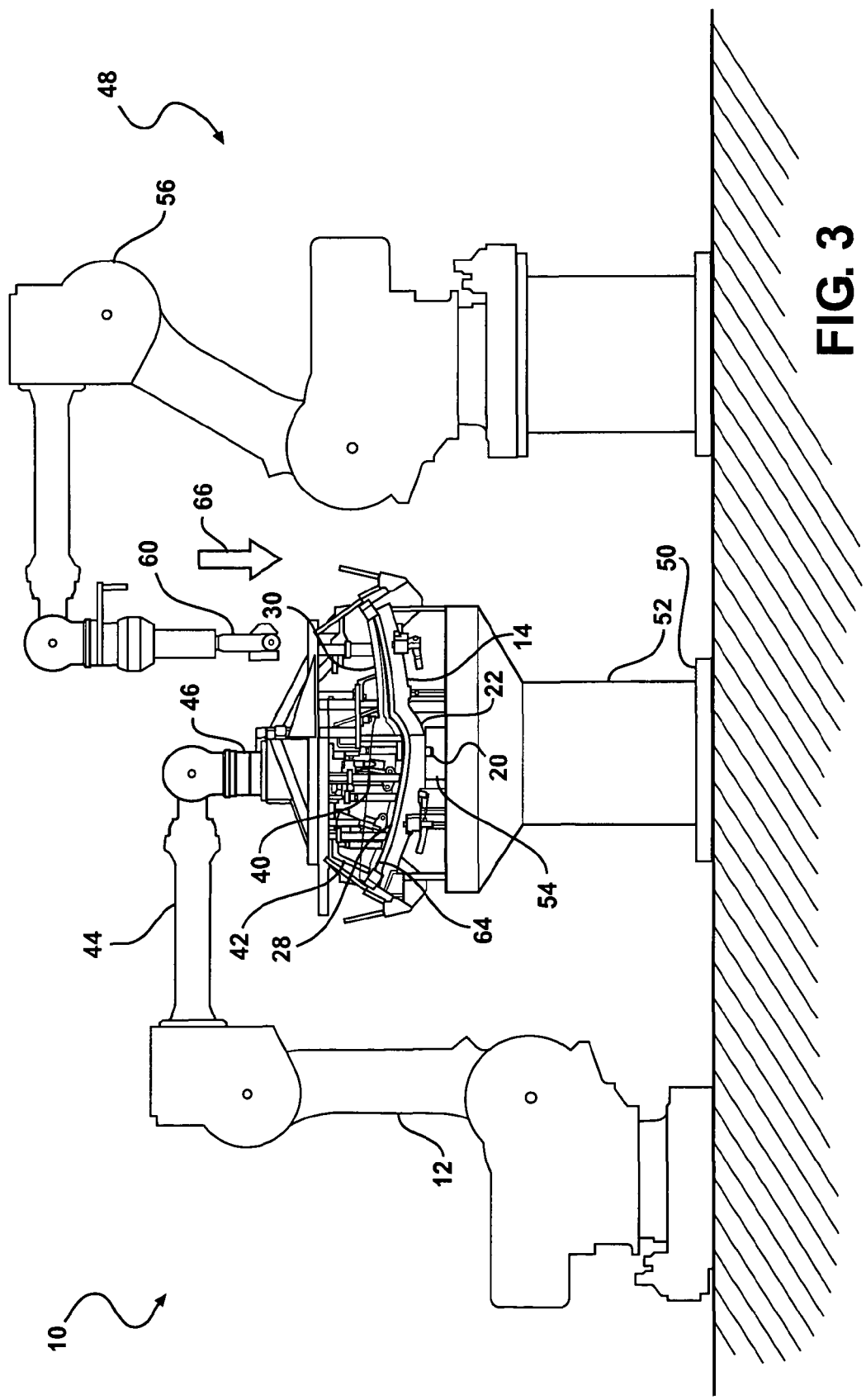

As illustrated in FIG. 3, the registration feature 20 of the anvil register 54 may be oriented such that when the anvil 14 is mated at 22 with the registration feature 20, the anvil 14 and metal panels 30 mounted on the anvil 14 are disposed in a generally horizontal position. Due to this orientation, the hemming robot 56 applies a push hemming force 66 against the metal panels 30 in a generally vertical direction. Further, the hemming robot 56 orients the roller hemming apparatus 60 such that the robot pushes the roller hemming apparatus against the metal panels 30 to perform a hemming operation on the panels.

Figure 4:
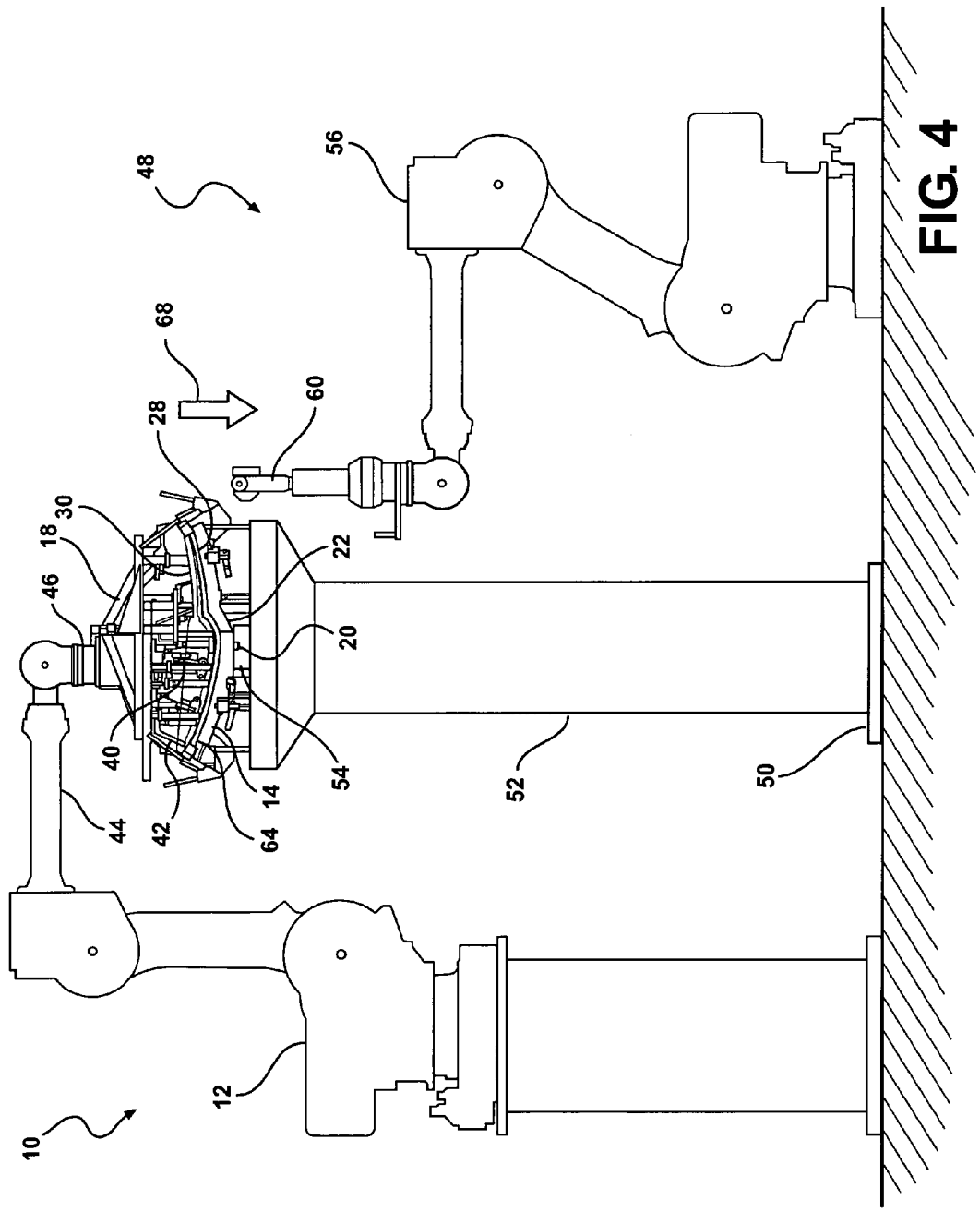

As illustrated in FIG. 4, the registration feature 20 of the anvil register 54 again may be oriented such that when the anvil 14 is mated at 22 with the registration feature 20, the anvil 14 and metal panels 30 mounted on the anvil 14 are disposed in a generally horizontal position. However, the hemming robot 56 orients the roller hemming apparatus 60 such that the robot pulls the roller hemming apparatus 60 towards the metal panels 30, applying a pull force 68 through the roller hemming apparatus, to perform a hemming operation on the panels.

It is apparent that the present system and method provides flexibility such as allowing the clamping spider 18 to be mounted to the anvil robot 12, or the anvil 14 to be mounted to anvil robot 12. It allows the hemming force to be applied horizontally or vertically; and provides for push roller hemming force 66 ("push compression") and pull roller hemming force 68 ("pull compression"). Although certain combinations of these variable parameters are described above, it should be understood that any combination of these parameters are within the scope of the invention.

Figure 13:
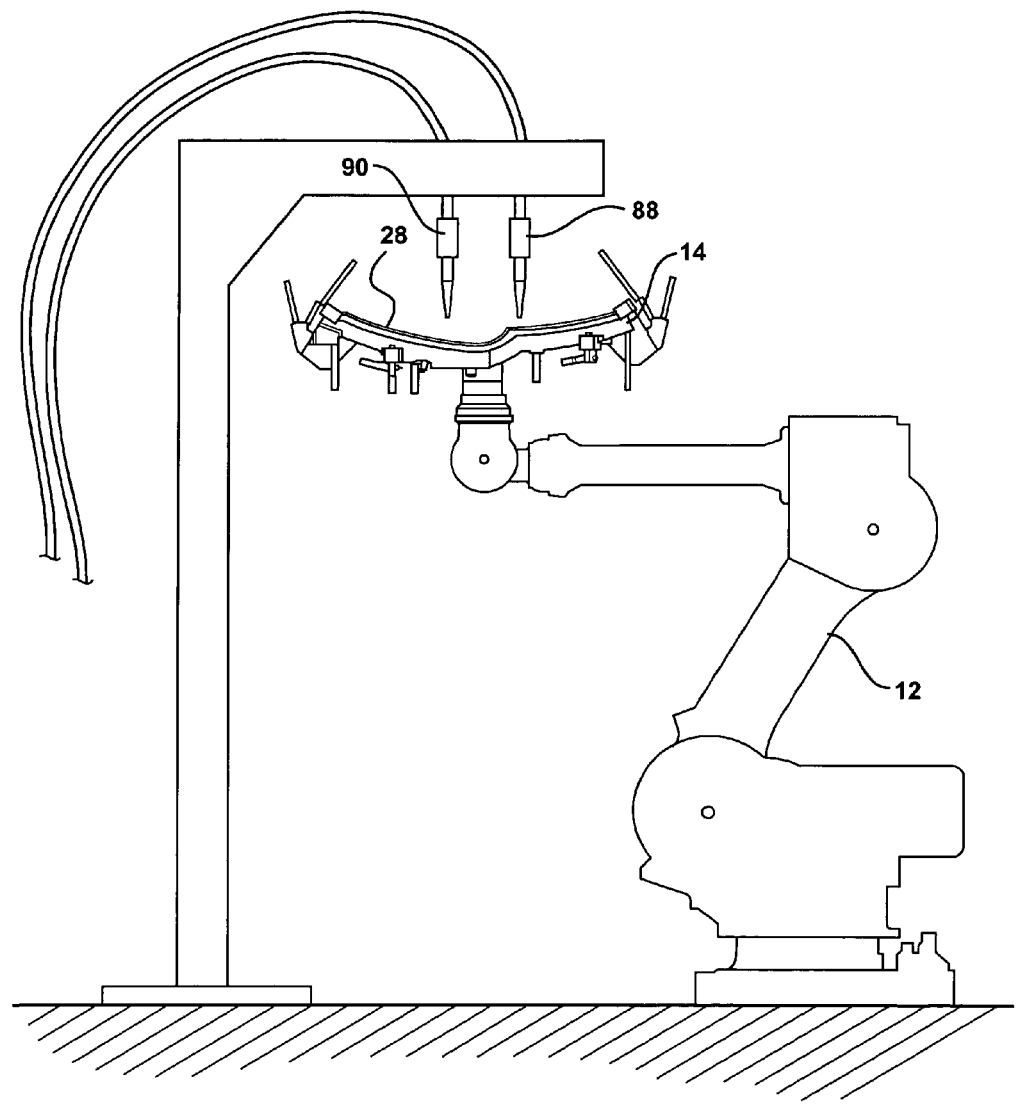

In a low volume production hemming process illustrated in FIG. 13, the anvil robot 12 may use the anvil 14 to carry the outer panel 28 through an adhesive 88 and mastic application pedestal 90. After application of adhesive and mastic, the inner panel 26 may be nested in the outer panel 28 and hemmed together in any manner described above. The anvil robot 12 may further transport the hemmed panels 80 to another location in the hemming work cell 48 for any additional final assembly operations such as welding, trimming, piercing, or similar.

Figure 14:
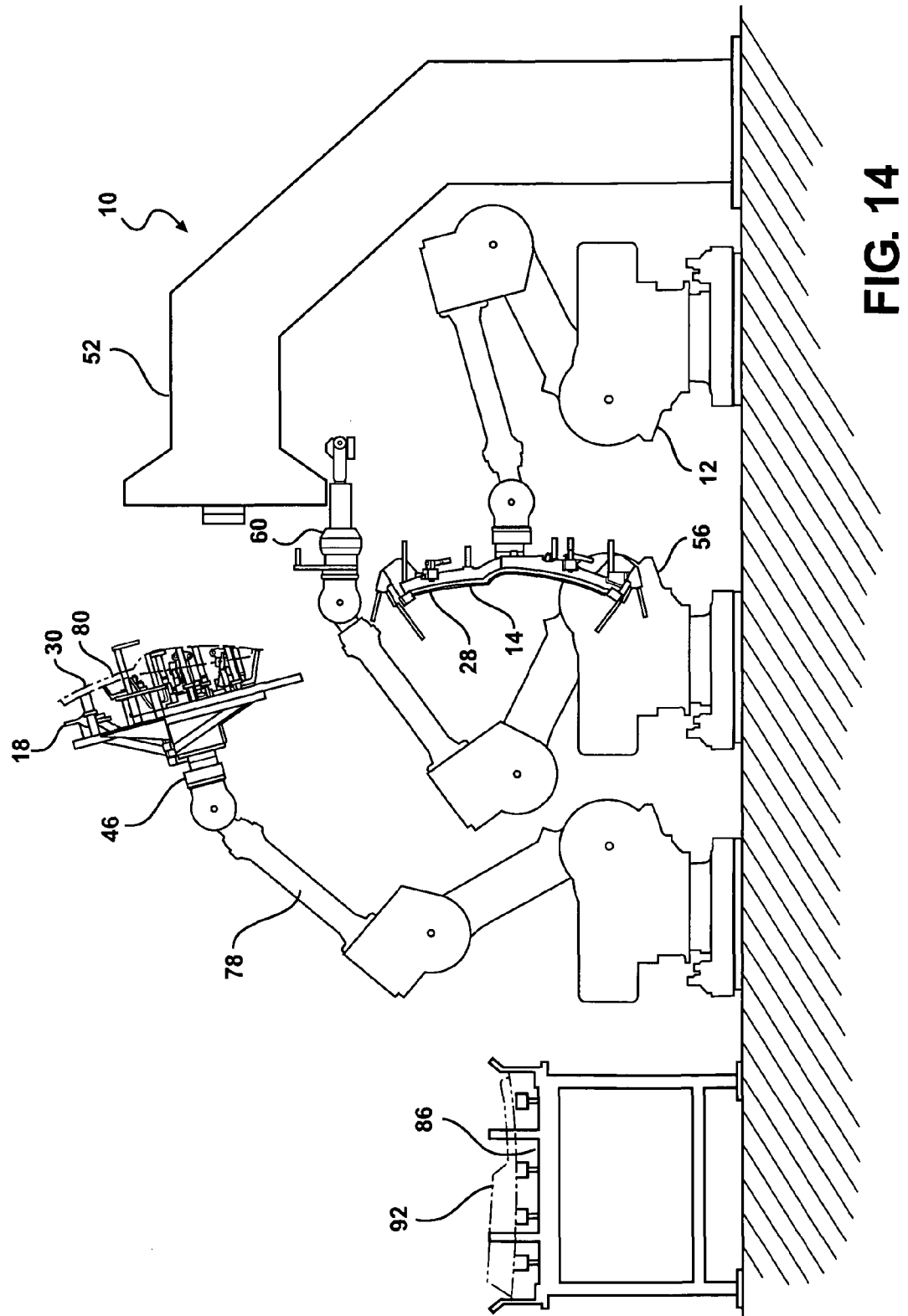

For higher volume production illustrated in FIG. 14, an additional robot 78 having a tool exchanger end effector 46 may be added to the hemming production work cell 48. The additional robot 78 may use the tool exchanger 46 to mount the clamping spider 18 after roller hemming has been completed on a set of nested metal panels 30. The clamping spider 18 may hold the hemmed panels 80 so that the additional robot 78 may transport the hemmed panels 80 to location(s) for final assembly operations 86 such as welding, trimming, piercing, or similar. Meanwhile, the anvil robot 12 may move the anvil 14 to a location at which a new outer panel 28 can be loaded onto the anvil 14. After loading of a new outer panel 28, the anvil robot 12 may transport the panel to an adhesive 88 and mastic application pedestal 90.

Figure 15:
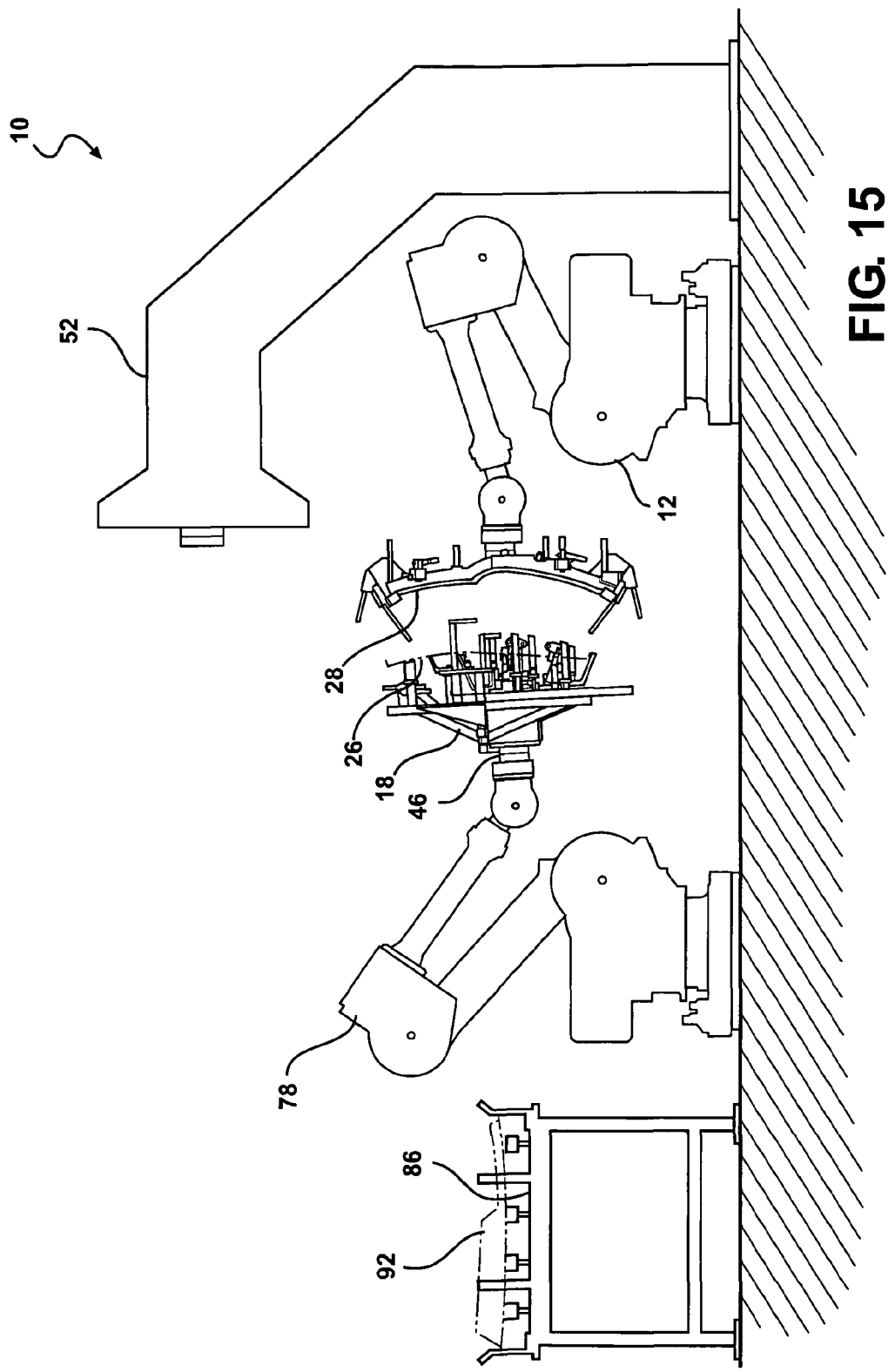

As illustrated in FIG. 15, an additional robot 78 unloads the hemmed panel assembly 92 after final assembly operations 86, and the additional robot 78 may then use the clamping spider 18 to mount an inner panel 26. The additional robot 78 transports the inner panel 26 to the anvil 14 for nesting of the inner panel 26 with the outer panel 28 in the anvil 14. Alternatively, the inner panel 26 may be nested with the outer panel 28 by other means. In any event, prior to hemming of the new outer 28 and inner panels 26, the additional robot 78 clamps 32 the clamping spider 18 to the anvil 14 and the panels, and releases the clamping spider 18 from the tool exchanger 46. The cycle is then repeated beginning with the hemming step.

As illustrated in FIGS. 5 through 8, the hemming system may optionally include cornering units 70 that may be mounted to the anvil 14. The cornering units 70 perform hemming operations such as pre-hem at 94 operations on corner portions of a panel 110 or other workpiece. By performing hemming operations on the corners of panels, the cornering units 70 reduce hemming cycle time. The cornering units 70 may be robotically driven 72, thereby also reducing the tooling investment cost of the system.

The cornering units 70 may be actuator 74 driven, wherein the actuator 74 may be mounted on the anvil 14 and its actuating energy source may be delivered to the actuator through the robotic tool exchanger 46 or other means of passage. The actuator 74 can be in the form of a pneumatic cylinder, linear actuator, electric actuator or any form of linear or rotary driving device that produces a means of movement.

Also, the actuator 74 may be stationary and mounted to the anvil register ("strong back register" 52) or mounted to the floor of the hemming system work cell 48. In any of the embodiments in which an actuator 74 is used to drive the cornering units 70, the actuator 74 moves the cornering units 70 in a similar manner as the embodiment in which the robot drives 72 the cornering unit 70.

Figure 5:
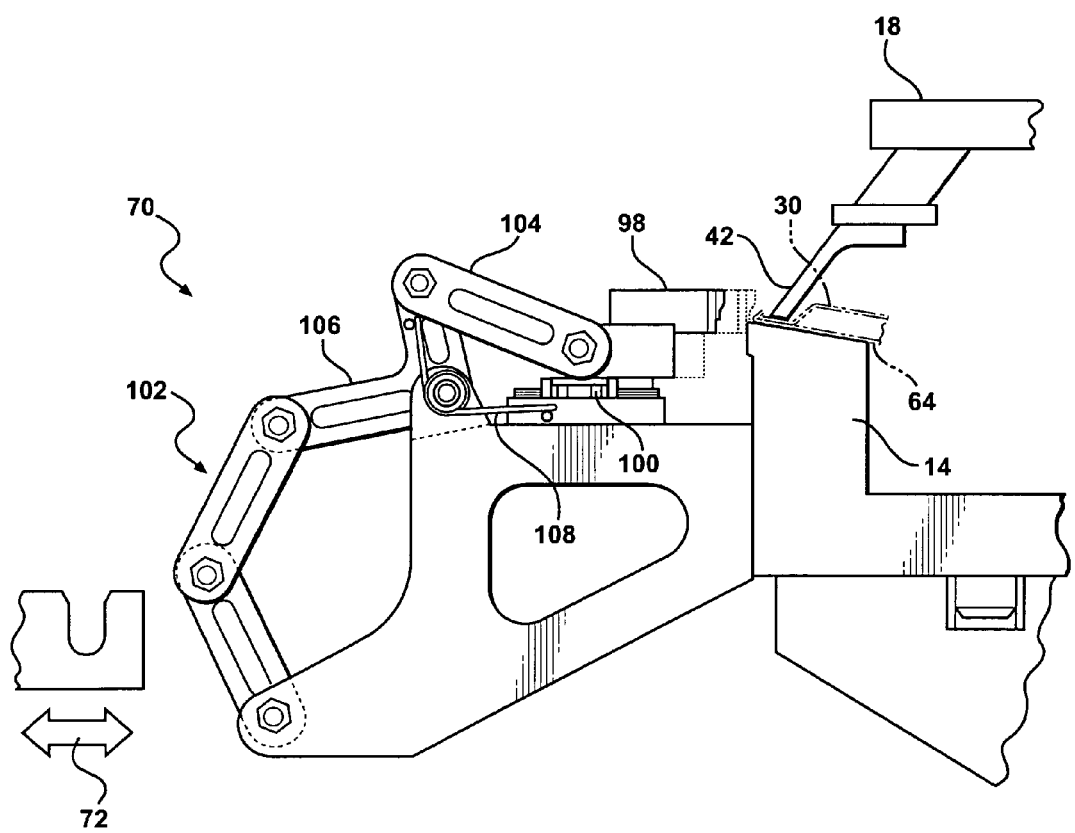
Figure 6:
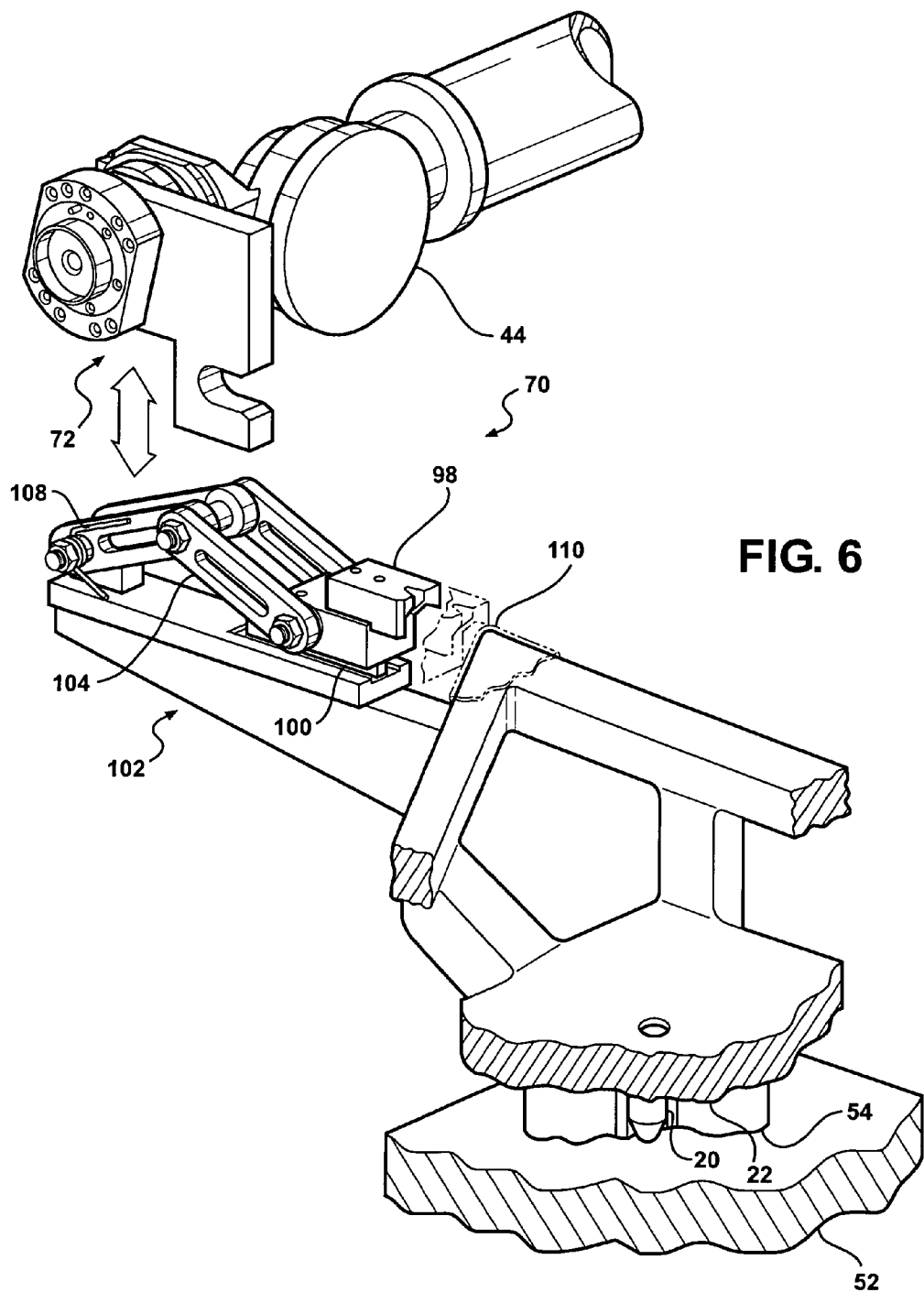

For example, as illustrated in FIG. 5, the cornering unit 70 is generally mounted along the side of the anvil 14. The cornering unit 70 includes a hemming tool such as a pre-hemming tool 98 or similar slidably mounted to a guide such as a linear rail 100. The hemming tool 98 is operatively connected to a mechanical linkage 102 for actuating movement of the hemming tool 98. The mechanical linkage 102 may include link bars 104 and an "L" crank arm 106, although the mechanical linkage 102 is not limited to the specific arrangement shown in the drawing figure. For example, an alternative mechanical linkage is shown in FIG. 6. When the anvil 14 is mated with the registration feature 20 of the anvil register 54 ("strong back register" 52), a robotic arm 44 in the hemming system may push on the mechanical linkage 102 in a generally horizontal direction, causing the hemming tool 98 to slide forward along the linear rail 100 and to contact the corner of a panel 110 disposed on the anvil 14, thereby performing a hemming operation on the panel.

The mechanical linkage 102 shown in FIG. 6 may be actuated by the robotic arm 44 pushing the mechanical linkage 102 in a generally vertical direction. After the hemming operation, the robotic arm 44 may move away from the mechanical linkage 102. The cornering unit may also include a torsion spring 108 or similar that biases the mechanical linkage 102 and moves the mechanical linkage 102 back to its original resting position, thereby sliding the hemming tool 98 back away from the panel 110.

Figure 7:
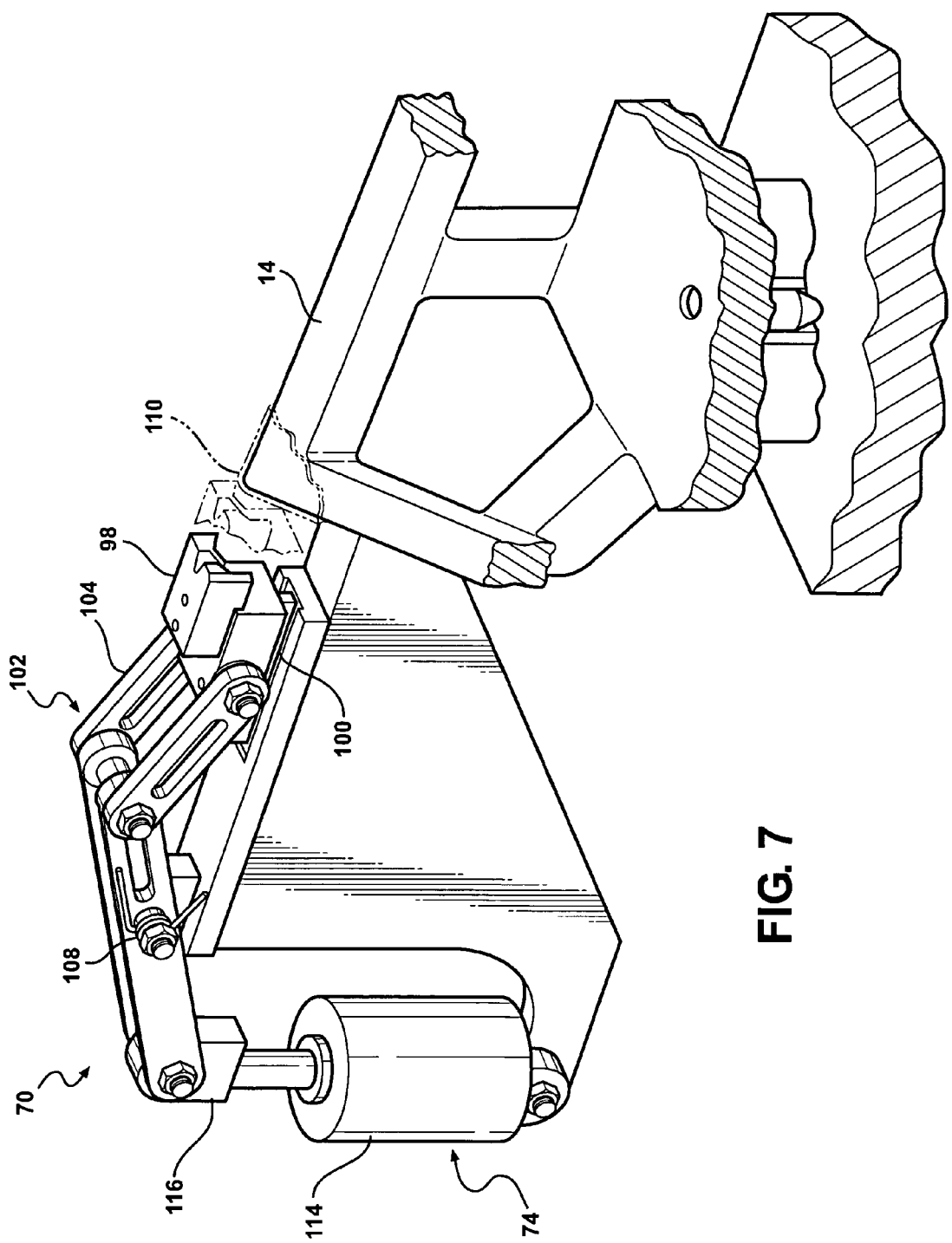

As illustrated in FIG. 7, the cornering unit 70 may be driven by an actuator 74 such as a pneumatic cylinder 114 or similar. In this disposition, the actuator 74 is mounted on the anvil 14. The cornering unit 70 includes a hemming tool 98 such as a pre-hemming tool or similar slidably mounted to a guide such as a linear rail 100. The hemming tool 98 is operatively connected to a mechanical linkage 102 for actuating movement of the hemming tool 98. The mechanical linkage 102 may include link bars 104 that are operatively connected to a piston 116 of the cylinder 114 at an end opposite the connection to the hemming tool 98. Outward movement of the cylinder piston 116 moves the mechanical linkage 102 and causes the hemming tool 98 to slide forward and contact a corner of a panel 110 disposed on the anvil 14, thereby effecting a hemming operation on the panel 18. Inward movement of the cylinder piston 116 reverses the movement of the hemming tool 98 to slide the hemming tool 98 away from the panel 28.

Figure 8:
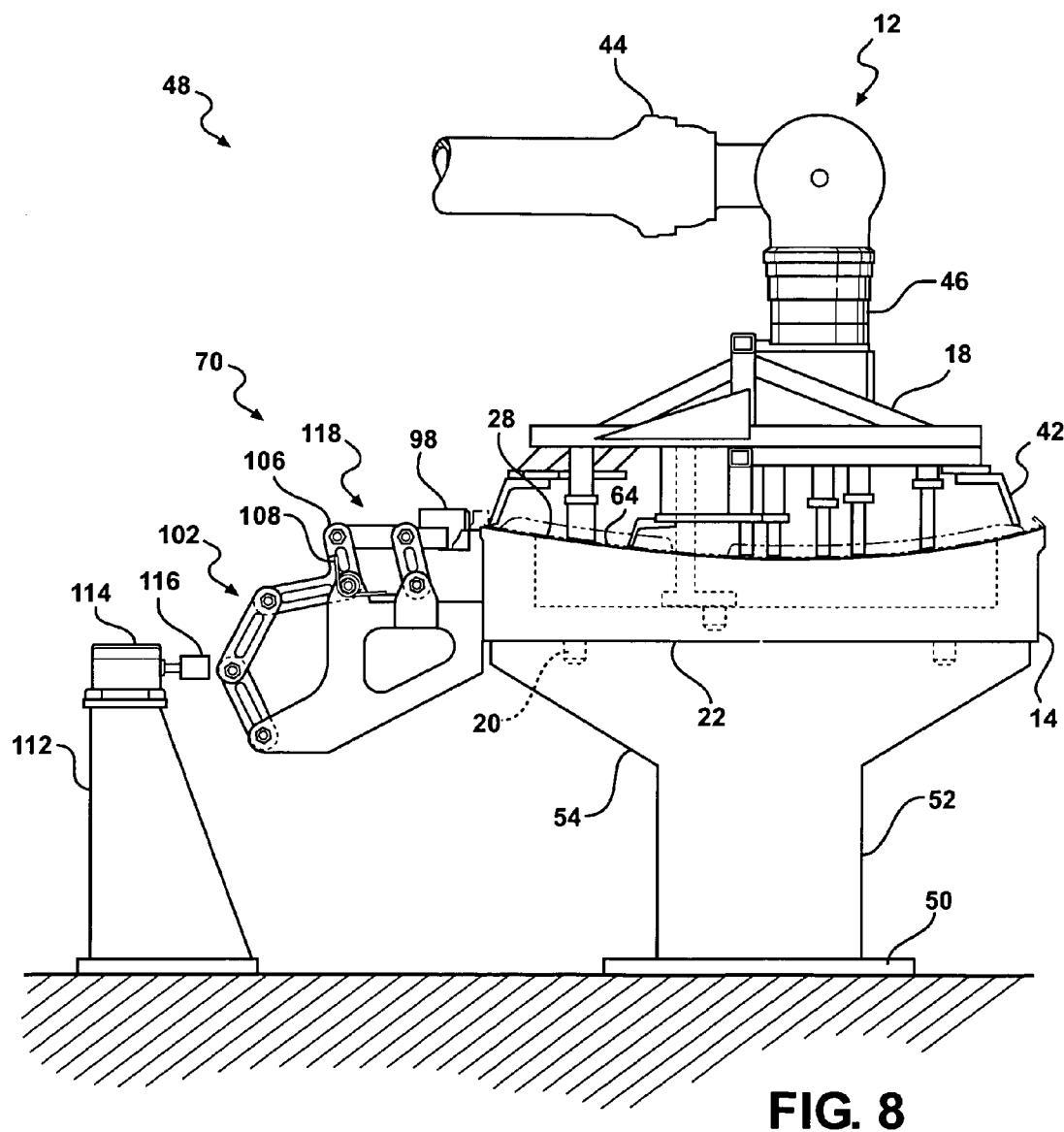

In FIG. 8, the cylinder 114 may be separate from the anvil 14 and may not be connected to the mechanical linkage 102 of the cornering unit 70. Instead, the cylinder 114 is generally mounted to the floor of the hemming system work cell 48. For example, the cylinder 114 may be mounted to a pedestal 112 having a base mounted on the floor. The cylinder 114 is disposed near to the anvil register 20. When an anvil 14 is mated at 22 with the registration feature 20 of the anvil register 54, the cornering unit 70 is disposed proximate to the mechanical linkage 102. An outward motion of the cylinder piston 116 causes the piston 116 to contact the mechanical linkage 102 and push the mechanical linkage 102 so as to move the hemming tool 98 towards a panel 28 to perform a hemming operation. After completion of the hemming operation, the cylinder 114 may retract the piston 116 away from the mechanical linkage 102. The cornering unit 70 may include a torsion spring 108 or similar that biases the mechanical linkage 102 and causes the mechanical linkage 102 (and connected hemming tool 98 via parallel links 118) to return to its resting position.

Figure 11:
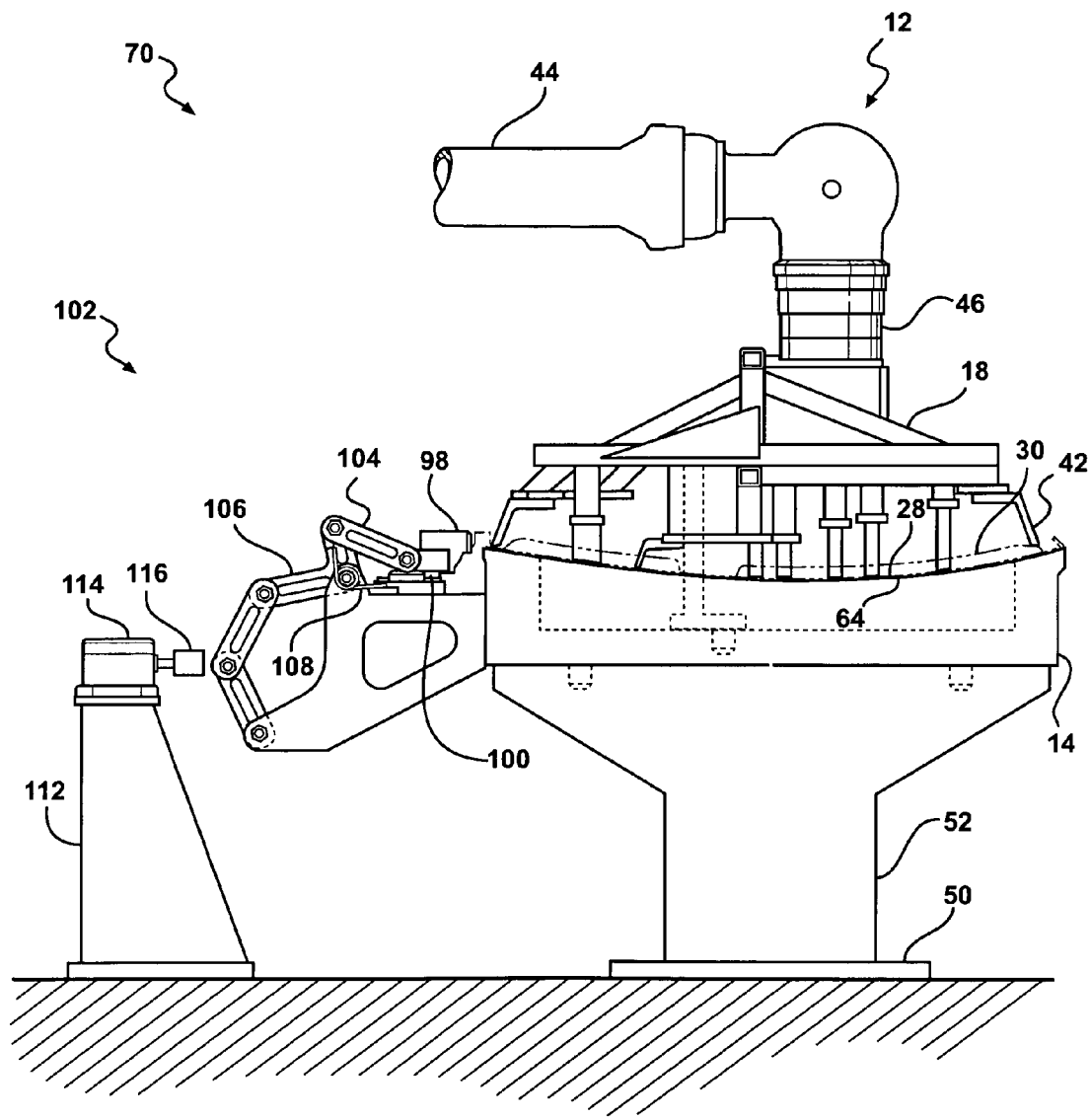
Figure 12:
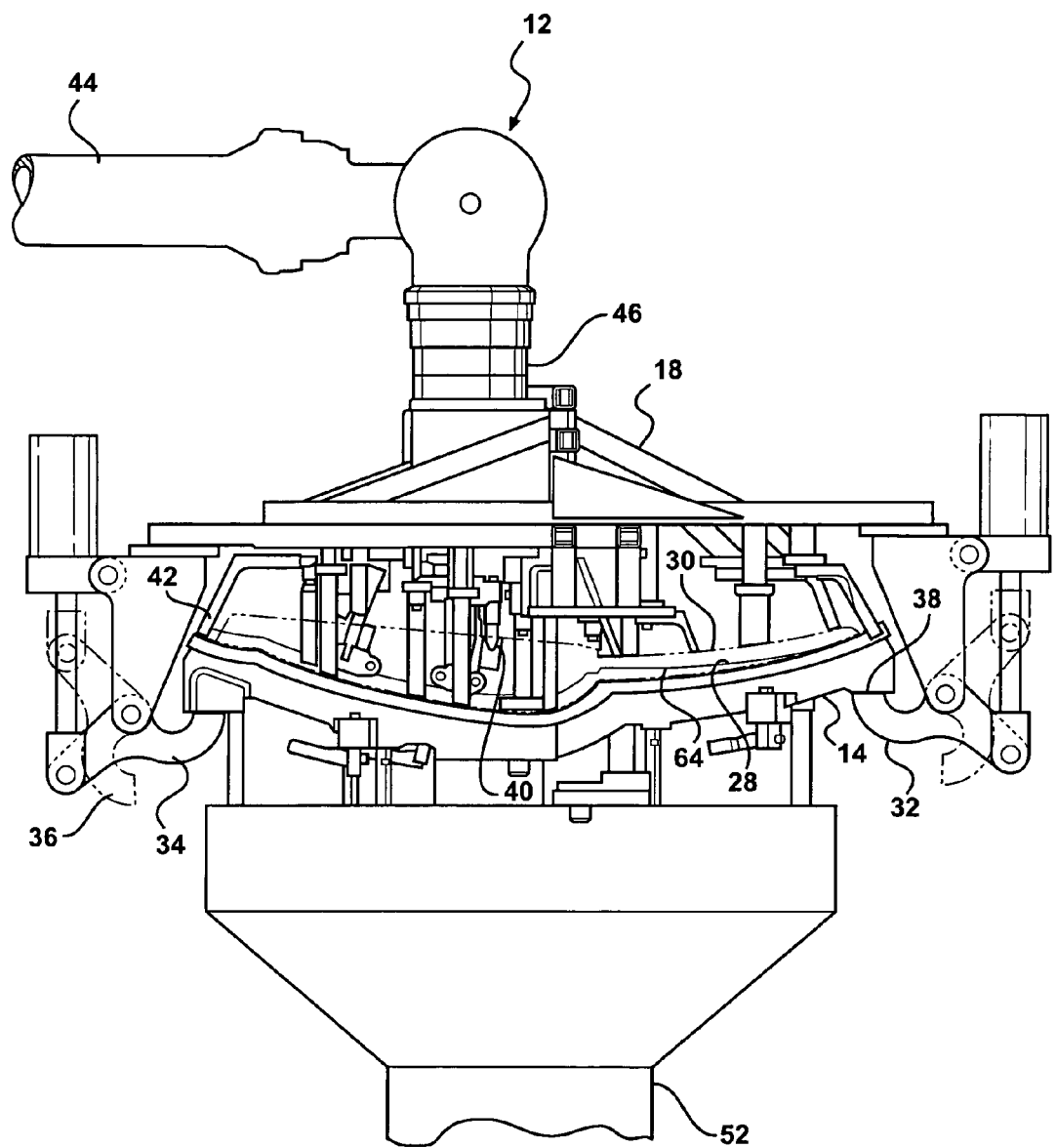

As shown in FIG. 11, the mechanical linkage 102 of FIG. 5 may be actuated by a cylinder piston similar to that described with reference to FIG. 8.

The present roller hemming system 10 and method allows for a flexible product mix within a single production cell. The present system 10 also allows introduction of new product models over short periods of downtimes (such as a weekend), thereby reducing production cell downtimes.

Also, the anvil 14 and clamping spider 18 of the hemming system 10 can be easily transported from one production location to another, facilitating their use/reuse in aftermarket service production.

Figure 9:
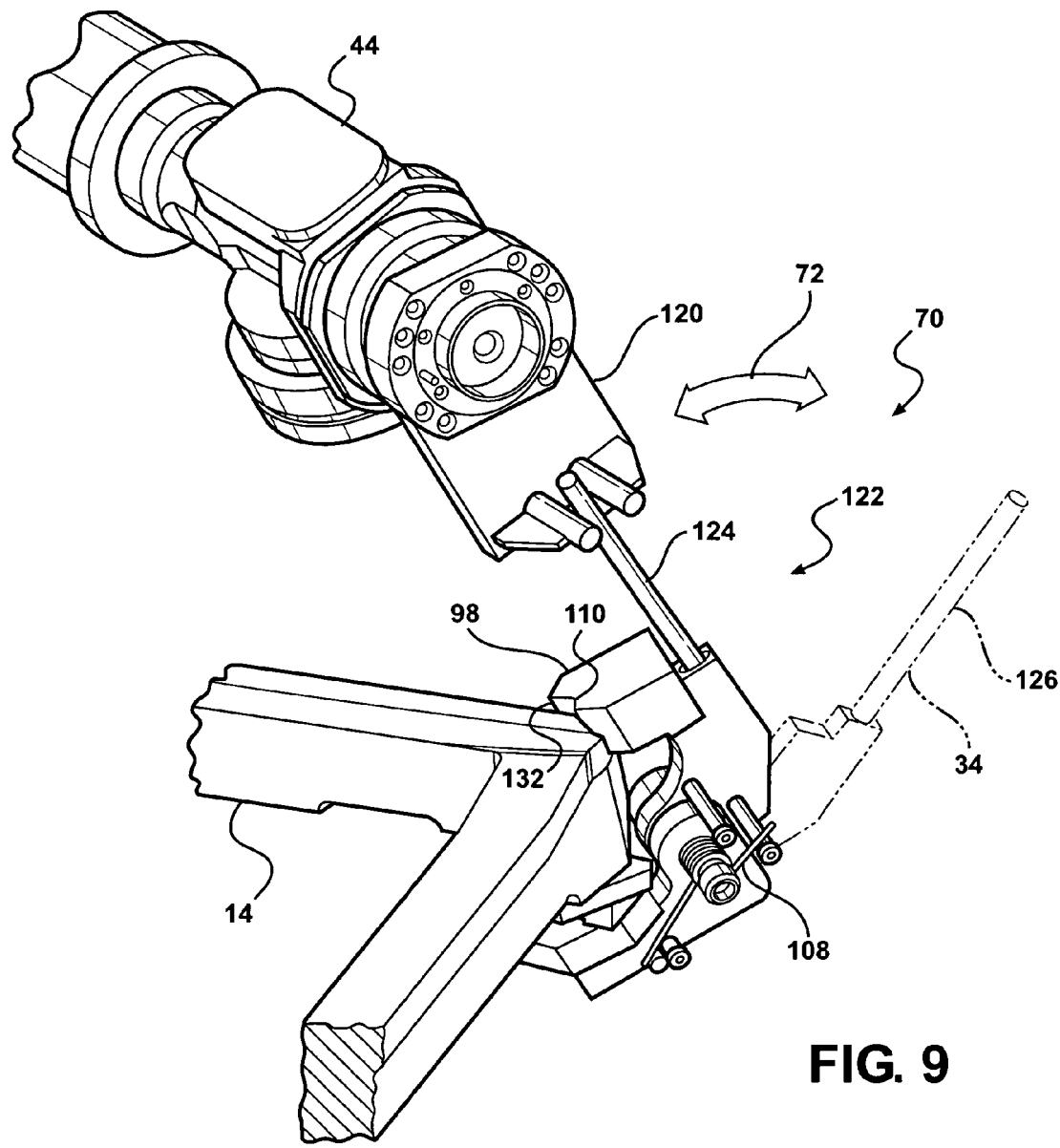
Figure 10:
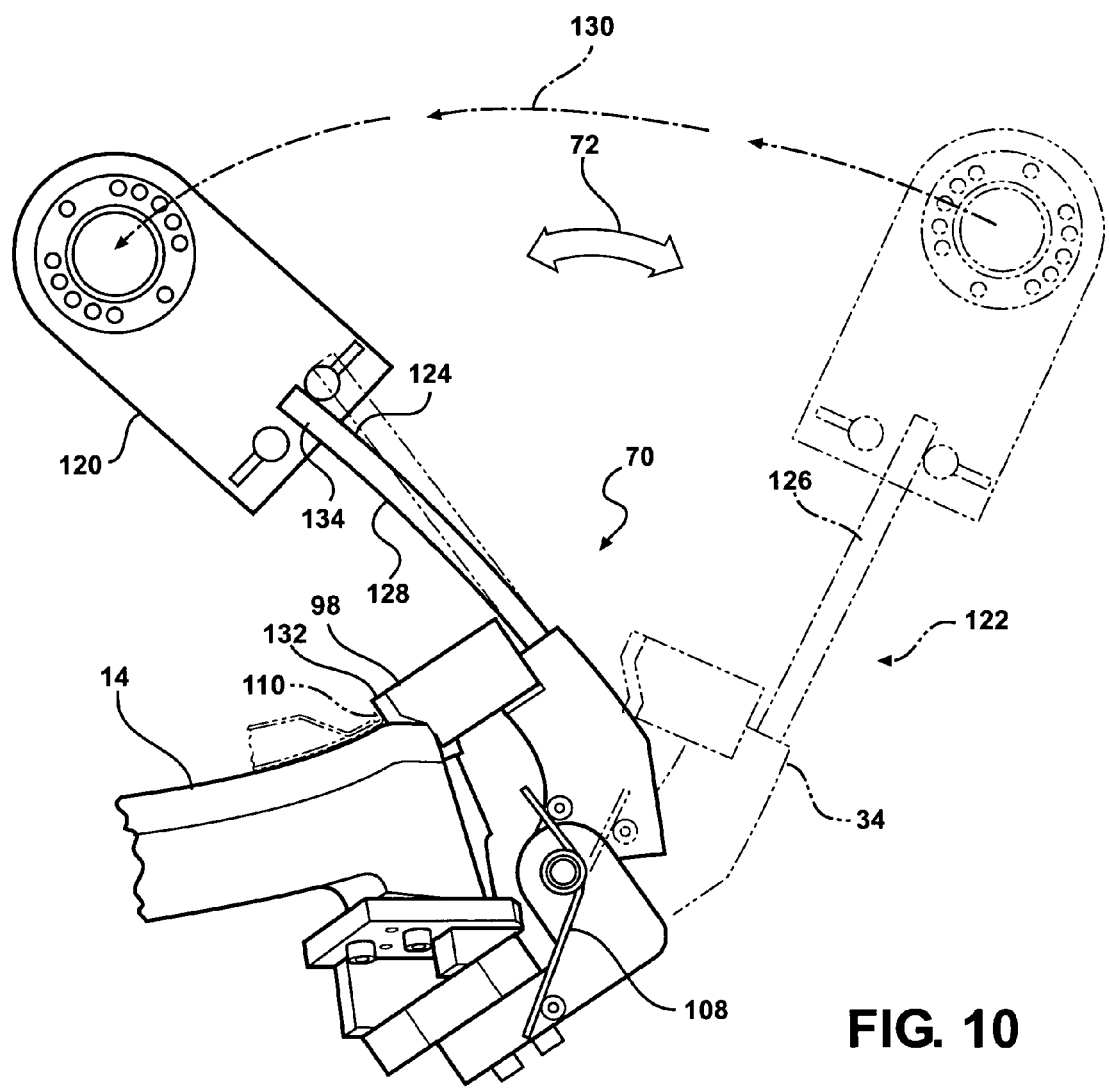

With reference to FIGS. 9 & 10, in operation the corner unit is actuated by the robot arm 44 via the corner unit actuator 120 in a programmed path 130 that pivotally moves the corner unit pivoting mechanism 122 to move the hemming tool 98 to contact the corner of a panel 110 to complete a pre or final hem on the panel. The corner unit actuator is positioned about the free state 126 position of the flexible lever 124 with the cornering unit 70 in the open position 34. The flexible lever 124 is moved by the corner unit actuator 120 until the hemming tool 98 contacts the anvil 14. Then the robot arm 44 continues moving to flex the flexible lever 124 to its flexed state 128, Lever Hemming position 134, ensuring that the hemming tool 98 has moved to its hemmed position 132. The flexing of the flexible lever 124 also allows for the programmed path 130 to be at a non-exact stop position. The flexed state 128 of the flexible lever 124 is past the hemmed position 132 of the hemming tool 98 ensuring that the panel is hemmed. The hemming tool 98 will produce a quality hem when the flexible lever 124 is moved to its flexed state 128.

To release the hemming tool to its open position at 34 the robot arm 44 moves the corner unit actuator 120 alone its programmed path 130 in an opposite direction from that stated hereabove. This is done incase the hemming tool 98 has a bind to the anvil 14 or outer panel 28. The force from the robot arm 44 will overcome the bind of the hemming tool 98 and outer panel 28. A torsion spring 108 is incorporated into the mechanism to hold the cornering unit 70 in the open position 34 during the transferring of the anvil 14 or when the anvil is orientated in a position as in vertical or up side down. The process of flexing the flexible lever past the free state reduces the requirement of precise programming of the corner unit path.

Although the invention has been described by reference to specific arrangements, it should be understood that numerous changes may be made within the spirit and scope of the inventive concepts described. Accordingly, it is intended that the invention not be limited to the described arrangements, but that it have the full scope defined by the language of the following claims.

What is claimed is:

1. A roller hemming system for edge hemming vehicle closures from nested metal panels, said system comprising:
   an anvil robot moveably supporting a hemming anvil having a working surface;
   a cornering unit mounted on said hemming anvil and including a non-rotatable hemming tool for performing hemming operations only on corners of said nested metal panels;
   a clamping spider cooperable with said anvil robot for clamping said nested metal panels on said working surface;
   an anvil register including a base and a registration feature for matingly positioning said hemming anvil thereto;
   a hemming robot including a multi-axis controllable arm;
   roller hemming apparatus mounted on a distal end of said multi-axis arm;
   said roller hemming apparatus being moveable along edges of said nested metal panels on said anvil to hem said panels together.

2. The system of claim 1 wherein said clamping spider includes a plurality of pivotal swing clamps pivotable between an open loading position and closed clamping position.

3. The system of claim 2 wherein said clamping spider includes a registration member for locating metal panels.

4. The system of claim 3 wherein said registration member is a register pin.

5. The system of claim 1 including a plurality of hemming robots.

6. The system of claim 1 including an additional robot having a tool exchanger end effector.

7. The system of claim 1 wherein said cornering unit is mounted along the side of said anvil.

8. The system of claim 1 wherein said cornering unit is mounted adjacent said anvil working surface.

9. The system of claim 1 including a cornering unit actuator for actuating said cornering unit to hem said nested metal panels in an engaged disposition of said hemming tool.

10. The system of claim 9 wherein said cornering unit actuator is a robot.

11. The system of claim 9 wherein said cornering unit actuator is a fluid actuated cylinder arrangement.

12. The system of claim 9 wherein said cornering unit actuator is a mechanical linkage assembly.

13. The system of claim 9 including a biasing member to bias said cornering unit hemming tool to a non-engaged disposition.

14. A process for edge hemming vehicle closures from nested metal panels, said process comprising the steps of:
   moveably supporting a hemming anvil having a working surface on an anvil robot;
   mounting a cornering unit on said hemming anvil, the cornering unit including a non-rotatable hemming tool for performing hemming operations only on corners of said nested metal panels;
   clamping said nested metal panels on said working surface using a clamping spider cooperable with said anvil robot;
   matingly positioning said hemming anvil to an anvil register including a base and a registration feature;
   providing a hemming robot including a multi-axis controllable arm including roller hemming apparatus mounted on a distal end of said multi-axis arm;
   moving said roller hemming apparatus along edges of said nested metal panels on said anvil to hem said panels together;
   actuating said cornering unit to hem corners of said nested metal panels.

* * * * *